US009858260B2

(12) United States Patent
Booth et al.

(10) Patent No.: US 9,858,260 B2
(45) Date of Patent: Jan. 2, 2018

(54) SYSTEM AND METHOD FOR ANALYZING ITEMS USING LEXICON ANALYSIS AND FILTERING PROCESS

(71) Applicant: Drumright Group LLP, Healdsburg, CA (US)

(72) Inventors: Stuart Thomas Booth, Oakton, VA (US); Alexander Xingzhi Jiang, Irvine, CA (US); Michael Allen Latta, Loveland, CO (US); Thien Huu Pham, Mission Viejo, CA (US)

(73) Assignee: DRUMRIGHT GROUP LLP, Healdsburg, CA (US)

( * ) Notice: Subject to any disclaimer, the term of this patent is extended or adjusted under 35 U.S.C. 154(b) by 386 days.

(21) Appl. No.: 14/242,669

(22) Filed: Apr. 1, 2014

(65) Prior Publication Data
US 2015/0278189 A1 Oct. 1, 2015

(51) Int. Cl.
*G06F 17/30* (2006.01)
*G06F 17/27* (2006.01)

(52) U.S. Cl.
CPC ........ *G06F 17/277* (2013.01); *G06F 17/2735* (2013.01); *G06F 17/30734* (2013.01)

(58) Field of Classification Search
None
See application file for complete search history.

(56) References Cited

U.S. PATENT DOCUMENTS

| | | | | |
|---|---|---|---|---|
| 5,963,965 A * | 10/1999 | Vogel | ................ | G06F 17/30696 |
| | | | | 707/999.003 |
| 6,523,028 B1 * | 2/2003 | DiDomizio | ....... | G06F 17/30398 |
| | | | | 707/748 |
| 2005/0027705 A1* | 2/2005 | Sadri | ................. | G06F 17/30994 |
| 2008/0235260 A1* | 9/2008 | Han | .................... | G06F 17/2247 |

* cited by examiner

*Primary Examiner* — Keith Bloomquist
(74) *Attorney, Agent, or Firm* — Thompson Coburn LLP

(57) ABSTRACT

The present invention is a method or system of analyzing items using lexicon analysis and filtering process. The present invention drives the analysis without a user being required to provide search terms and Boolean queries. Further, the present invention merges the use of unstructured data and structured data using a lexicon as a focus. Structured data is mapped to lexicon terms through one analysis process, while unstructured data is mapped to lexicon terms through a separate analysis process. The result is an analysis that merges the two different sets of data, which enables a user to navigate through the items using lexicons. Analysis results are displayed simultaneously in a tabular view, geospatial view, and lexicon histogram.

24 Claims, 10 Drawing Sheets

```
Initialize the stack to empty
For each input element in depth first order:
    If a start element:
        If the element represents a new resource
            Create the resource
            Generate the association properties between this and the resource on the stack
            Push the resource on the stack
        Else
            Add the element to the stack of element names
    Else If an end element
        If the element is mapped to a synthetic resource
            Place the element value in the property of the synthetic resource
        Else
            Generate RDF statements from the input value of the element
        If the element stack for the current resource is not empty
            Remove the top element from the element stack
        Else
            Generate id and other properties for the top resource
            Remove the top resource from the stack
```

[ mcT2a: (?mcjp:MainChargeTier2 :Commercial: ) (?ncjp:MainChargeTier1 :High Explosive") ->
(?mcrdf:type lex:HE_Commercial_Explosives ) ( ?mc hl:match "Commercial" ) ( ?mc hl:match "High Explosive" ) ]

[ inc1: ( ?r jp:MainLocationKey ?k ) ( ?l jp:LocationKey ?k ) ( ?l jp:Latitude ?lat ) -> ( ?r jp:incident_lat ?lat ) ]

SYSTEM AND METHOD FOR ANALYZING ITEMS USING LEXICON ANALYSIS AND FILTERING PROCESS

FIELD OF THE INVENTION

The present invention generally relates to a method or system of analyzing items by using lexicon analysis and filtering process.

BACKGROUND OF THE INVENTION

It is often very tedious and time consuming to search through a large pile of documents or reports when only one or a few documents are likely to possess most of the information needed. Simple key word searches or conventional queries would not provide a solution to this problem because a user is often not familiar with the subject matter that is at issue, and thus, is not able to figure out a fast and easy way to find a proper key word. The need for a fast search and easy identification of required information is manifest in many sectors of industry.

A lexicon analysis has been developed to assist non-experts perform an efficient search and analysis of documents in a particular field. However, lexicon analysis alone fails to resolve the problem presented above because there still exists a technical issue as to how to put various types of data into a single lexicon analysis and how to present various types of data to an end user for an efficient analysis. Moreover, conventional lexicon analyses separated lexicons themselves from the application of the lexicons. This caused additional problems such as difficulty in adjusting or updating old lexicons and adapting to the user's criteria or need generated after the creation of lexicons.

The present invention is directed to overcoming one or more of the problems set forth above.

SUMMARY OF INVENTION

This section provides a general summary of the disclosure and is not a comprehensive disclosure of its full scope or all of its features.

An aspect of this invention provides a system for analyzing items using a lexical analysis and filtering process that includes a data storage unit storing source data comprising a plurality of items, wherein the source data is one of structured data and unstructured data; a processor associated with the data storage unit, wherein the processor extracts data from each item of the source data and the extracted data is associated with an item from which the data is extracted and maps each of the plurality of items with at least one lexicon term and the extracted data is analyzed to identify a match between the plurality of items and lexicon terms and the lexicon terms are represented as a network of a plurality of nodes and each node represents a lexicon term, which includes at least one of a parent node to which the lexicon term is subordinate and a child node to which the lexicon term is superordinate; and an electronic display for presenting the source data utilizing the processor configured to present a first group of items based on the extracted data of items in at least one of tabular view and geospatial view and first group of items represent items having at least one common characteristic of the extracted data, and present a second group of items and second group of items represent the items mapped to a first matching lexicon terms of the plurality of lexicon terms in at least one of the tabular view and the geospatial view.

Another aspect of this invention provides a method for analyzing items using lexical analysis and filtering process, which includes storing a plurality of items in a data storage unit, wherein the plurality of items are represented by source data and the source data is one of structured data and unstructured data; processing the plurality of items to extract data from each item of the plurality of items, wherein the extracted data is associated with an item of the plurality of items; displaying a first group of items based on the extracted data of the items on an electronic display presented in at least one of a tabular view and a geospatial view, wherein the electronic display is electrically connected to at least one processor in electronic communication with the source data, wherein the first group of items represents items having at least one common characteristic of the extracted data; mapping each of the plurality of items with at least one lexicon term, wherein the extracted data is analyzed to identify a match between the plurality of items and lexicon terms, wherein the lexicon terms are represented as a network of a plurality of nodes and each node of the plurality of nodes represents a lexicon term, which is subordinate to at least one of a parent node and a child node; and displaying a second group of items, wherein the second group of items represent the items mapped to a first matching lexicon term of the plurality of lexicon terms on the electronic display presented in at least one of the tabular view and the geospatial view, wherein the electronic display is electrically connected to at least one processor in electronic communication with the source data.

Still another aspect of this invention provides a system for presenting a plurality of items in multiple views that includes an electronic display; a processor that is electrically connected to the electronic display; and a data storage unit associated with the processor and in electronic communication therewith, wherein the processor is able to present a tabular view of a plurality of items to the electronic display, wherein the tabular view comprises certain information obtained from the items and the information represents certain characteristics of the items and the electronic display presents a geospatial view of the items to the user, wherein the geospatial view comprises a geographical map displaying a geographical representation associated with the location information obtained from each item, wherein the geospatial view is concurrently displayed with the tabular view; and the electronic display presents a lexicon histogram view of the items to the user, wherein the lexicon histogram view comprises a plurality of matching lexicon terms and corresponding match count for each of the plurality of matching lexicon terms, wherein the matching lexicon term represents a lexicon term mapped to each item and the match count represents a number of matches between each of the matching lexicon terms and a certain group of the items wherein the lexicon histogram view that is concurrently displayed with the tabular view and the geospatial view on the electronic display, wherein the lexicon terms are represented as a network of a plurality of nodes and each node represents a lexicon term which includes at least one of a parent node to which the lexicon term is subordinate and a child node to which the lexicon term is superordinate.

Yet another aspect of this invention provides a method for presenting a plurality of items in multiple views, which includes presenting a tabular view of a plurality of items on an electronic display that is electronically connected to a processor, wherein the processor is configured to present the tabular view on the electronic display with select information obtained from the plurality of items and the select information represents certain characteristics of the items;

presenting a geospatial view of the plurality of items on the electronic display that is electronically connected to the processor, wherein the processor is configured to present the geospatial view on the electronic display and the geospatial view includes a geographical map displaying a geographical representation associated with location information obtained from each item of the plurality of items and the geospatial view is concurrently displayed with the tabular view on the electronic display; and presenting a lexicon histogram view of the plurality of items on the electronic display, wherein the processor is configured to present the lexicon histogram view that includes a plurality of matching lexicon terms and corresponding match count for each of the plurality of matching lexicon terms and each matching lexicon term of the plurality of lexicon terms is mapped to each item of the plurality of items generating a count representing a number of matches between each of the matching lexicon terms and a certain group of the items and the lexicon histogram view is concurrently displayed with the tabular view and the geospatial view on the electronic display and the lexicon terms are represented as a network of a plurality of nodes and each node represents a lexicon term, which includes at least one of a superordinate parent node and a subordinate child node.

In still yet another aspect of this invention provides a system for presenting a plurality of items in using lexical analysis that includes an electronic display; a processor that is electrically connected to the electronic display; and a data storage unit associated with the processor and in electronic communication therewith, wherein the data storage unit includes source data comprised of a plurality of items and the source data is structured data, wherein the processor is able to process the source data to extract data from each item of the source data, wherein the extracted data is associated with an item from which the data is extracted; create a plurality of tuple-structures for each item and the tuple-structure comprises a source, predicate, and object; and then map the item with at least one lexicon term and at least one of the source, predicate, and object of the tuple-structure is analyzed to find a matching lexicon term for viewing on an electronic display.

In yet another aspect of this invention provides a method for analyzing items using lexical analysis and filtering process, which includes storing a plurality of items in a data storage unit associated with a processor, wherein the plurality of items are represented by source data and the source data is one of structured data and unstructured data; processing the plurality of items to extract data from each item of the plurality of items, wherein the extracted data is associated with an item of the plurality of items and the processor is configured to extract textual data from the unstructured data and is configured to extract data from the structured data in order to create a plurality of tuple-structures for each the item of the structured data and the tuple-structure comprises at least one of a source, a predicate, and an object; mapping each of the plurality of items with at least one lexicon term, wherein the processor is configured to find a match between the plurality of items and lexicon terms and the processor is configured to find a match between the textual data and lexicon terms and also between the textual data and synonyms for the lexicon terms, and further configured to find a match between the tuple-structure and lexicon terms and at least one of the source, predicate, and object of the tuple-structure is analyzed to find a matching lexicon term.

Another aspect of this invention provides a system for analyzing items using lexical analysis and filtering process that includes a data storage unit storing source data comprising a plurality of items and the source data is one of structured data and unstructured data; and a processor associated with the data storage unit, wherein the processor extracts data from each item of the plurality of items, wherein the extracted data is associated with an item of the plurality of items, wherein the processor is configured to extract textual data from the unstructured data and is configured to extract data from the structured data in order to create a plurality of tuple-structures for each the item of the structured data and the tuple-structure comprises at least one of a source, a predicate, and an object and maps each of the plurality of items with at least one lexicon term wherein the processor is configured to find a match between the plurality of items and lexicon terms, wherein the processor is configured to find a match between the textual data and lexicon terms and also between the textual data and synonyms of the lexicon terms, and further configured to find a match between the tuple-structure and lexicon terms and at least one of the source, predicate, and object of the tuple-structure is analyzed to find a matching lexicon term.

In yet another aspect of this invention provides a method for analyzing items using lexical analysis and filtering process, which includes storing a plurality of items in a data storage unit associated with a processor, wherein the plurality of items are represented by source data and the source data is one of structured data and unstructured data; processing the plurality of items to extract data from each item of the plurality of items, wherein the extracted data is associated with an item of the plurality of items and the processor is configured to extract textual data from the unstructured data and is configured to extract data from the structured data in order to create a plurality of tuple-structures for each the item of the structured data and the tuple-structure comprises at least one of a source, a predicate, and an object; mapping each of the plurality of items with at least one lexicon term, wherein the processor is configured to find a match between the plurality of items and lexicon terms and the processor is configured to find a match between the textual data and lexicon terms and also between the textual data and synonyms for the lexicon terms, and further configured to find a match between the tuple-structure and lexicon terms and at least one of the source, predicate, and object of the tuple-structure is analyzed to find a matching lexicon term These are merely some of the innumerable aspects of the present invention and should not be deemed an all-inclusive listing of the innumerable aspects associated with the present invention. These and other aspects will become apparent to those skilled in the art in light of the following disclosure and accompanying drawings. The description and specific examples in this summary are intended for purposes of illustration only and are not intended to limit the scope of the present disclosure.

BRIEF DESCRIPTION OF DRAWINGS

The drawings described herein are for illustrative purposes only of selected embodiments and not all possible implementations, and are not intended to limit the scope of the present disclosure.

FIG. 5 illustrates a parsing logic in a pseudo code form according to an illustrative, but nonlimiting, exemplary embodiment;

FIG. 7(a) illustrates an exemplary mapping rule according to an illustrative, but nonlimiting, exemplary embodiment;

FIG. 7(b) illustrates an exemplary mapping rule according to an illustrative, but nonlimiting, exemplary embodiment;

Figure 1:
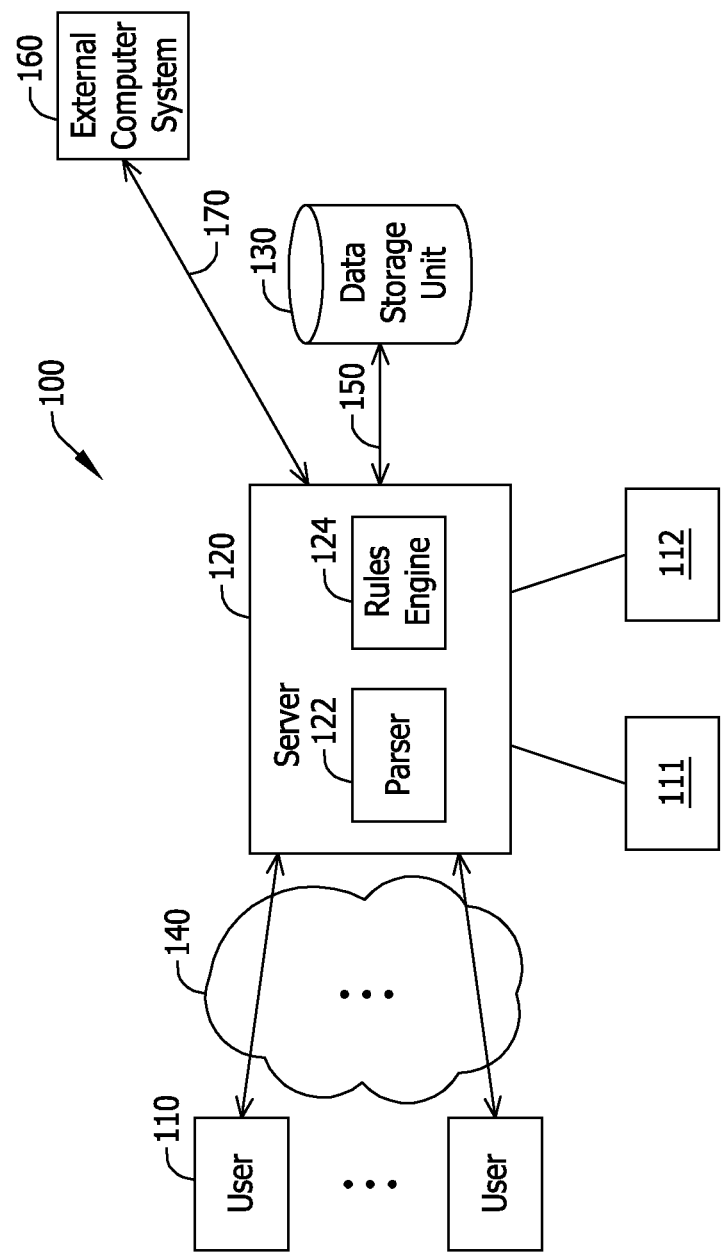
FIG. 1 illustrates a schematic block diagram of a system according to an illustrative, but nonlimiting, exemplary embodiment.

Reference characters in the written specification indicate corresponding items shown throughout the drawing figures.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as to obscure the present invention.

1. Description of Overall System

FIG. 1 is a schematic block diagram of an illustrative, but nonlimiting, system 100 for an exemplary embodiment. The illustrative, but nonlimiting, exemplary system of FIG. 1 may include a plurality of user computers 110, a processor, e.g., server, 120, a data storage unit 130, a network 140, a data link 150, and an external computer system 160. The user computers 110 are connected to the processor, e.g., server, 120 through the network 140. The processor, e.g., server, 120 is connected to the data storage unit 130 through the data link 150. The user computers 110 can be any device with sufficient computational and network-connectivity capabilities to interface with the processor, e.g., server, 120 for the purposes described herein. For example, the user computers 110 can be a mobile device such as a smartphone, e.g., iPhone, a Google Android device, a BlackBerry device, and so forth, tablet computer, e.g., iPad, or the like. The user computers 110 can also take forms such as a personal computer, e.g., a desktop computer or laptop computer. The processor, e.g., server, 120 can be any computer with sufficient computational and network-connectivity capabilities to interface with the user computers 110 and the data storage unit 130. The processor, e.g., server, 120 and the user computer 110 can be configured to be or reside on the same computer. It should be understood that the processor, e.g., server, 120 may comprise multiple servers or processors.

The data storage unit 130 can be any memory storage medium, computer memory, database, or database server suitable to store electronic data. The data storage unit 130 can be a separate computer independent from the processor, e.g., server, 120. The data storage unit 130 can also be a relational data storage unit. Furthermore, the data storage unit 130 can reside on the processor, e.g., server, 120 as an internal memory, or alternatively, can be configured to reside on more than a single location.

The network 140 can be any data communications network capable of communicating data between the processor, e.g., server, 120 and any of the user computers 110. An example of a suitable network is the Internet. However, it should be understood that the network 140 can comprise a plurality of networks that interconnect to form a larger network, including networks such as cellular data networks and other wireless or wired data networks.

The data link 150 is preferably an internal data communication link between the processor, e.g., server, 120 and the data storage unit 130. However, it should be understood that as the processor, e.g., server, 120 and the data storage unit 130 can be connected through an outside network, e.g., the Internet, the data link 150 can be any network suitable for the transmission of electronic data. Preferably, the user computers 110 provide an electronic display along with an input/output capability. Alternatively, a separate electronic display 111 and input/output device, e.g., keyboard, 112 can be utilized in direct electronic communication with the processor, e.g., server, 120. Any of a wide variety of electronic displays and input/output devices may be utilized with the present invention.

The external computer system 160 can be any computer system with sufficient computational and network-connectivity capabilities to interface with the server 120. The external computer system 160 can comprise multiple computer systems.

The system 100 provides an analysis method for a certain type of items, e.g., reports or documents, which centers on the use of a lexicon. The system 100 drives the analysis without a user being required to provide search terms and Boolean queries. This provides a significant improvement over conventional search methods. Further, the system 100 merges the use of unstructured data and structured data using a lexicon as a focus. Structured data is mapped to lexicon terms through one analysis process, while unstructured data is mapped to lexicon terms through a separate analysis process. The result is an analysis that merges the two different sets of data, which enables a user to navigate through the items using lexicons.

Analysis results are preferably, but not necessarily, displayed simultaneously in a tabular view, geospatial view, and lexicon histogram. The tabular view can present certain information about items, e.g., reports or documents, of either structured or unstructured nature. The geospatial view presents geographical information about items. The lexicon histogram allows both navigation of lexicons and analysis of frequency of lexicon terms mapped to the items. The fusing of multiple source data, source data types, and concurrent display of different types of information into one cohesive whole is the primary value proposition of the present invention.

(1) Importing Lexicon

In operation, the system 100 can import lexicon data from an outside source (not shown). Any available means for transporting lexicon data to the system 100 can be used. For example, lexicon data can be delivered to the system 100 as a form of hard copies. The lexicon data can also be stored in an electronic medium such as a CD, DVD, USB thumb drive, or the like and delivered to the system 100. In one embodiment, lexicon data is stored as a Java Script Notation (JSON) file and electronically transmitted to the system 100. In this embodiment, the processor, e.g., server, 120 is connected to a supplier of the lexicon data through a network. However, it should be understood that any other suitable type of transportation means can be employed for the delivery of lexicon data from a lexicon source to the system 100 and any form of lexicon data can be implemented for the purposes described herein. The system 100 stores the imported lexicon data in the data storage unit 130 for further analysis as discussed below.

The imported lexicon data represents conceptual definitions of certain terminologies in a particular field that were developed by Subject Matter Experts (SMEs). In one illustrative, but nonlimiting, embodiment, a lexicon may contain conceptual definitions of a plurality of lexicon terms concerning an improvised explosive device (IED). In this specific embodiment, the system 100 can import lexicon data developed for Weapons Technical Intelligence (WTI). It should be understood, however, that the present invention is not limited to a particular field or expertise for purposes of importing and analyzing lexicon data but a wide spectrum of applications are applicable.

Figure 2:
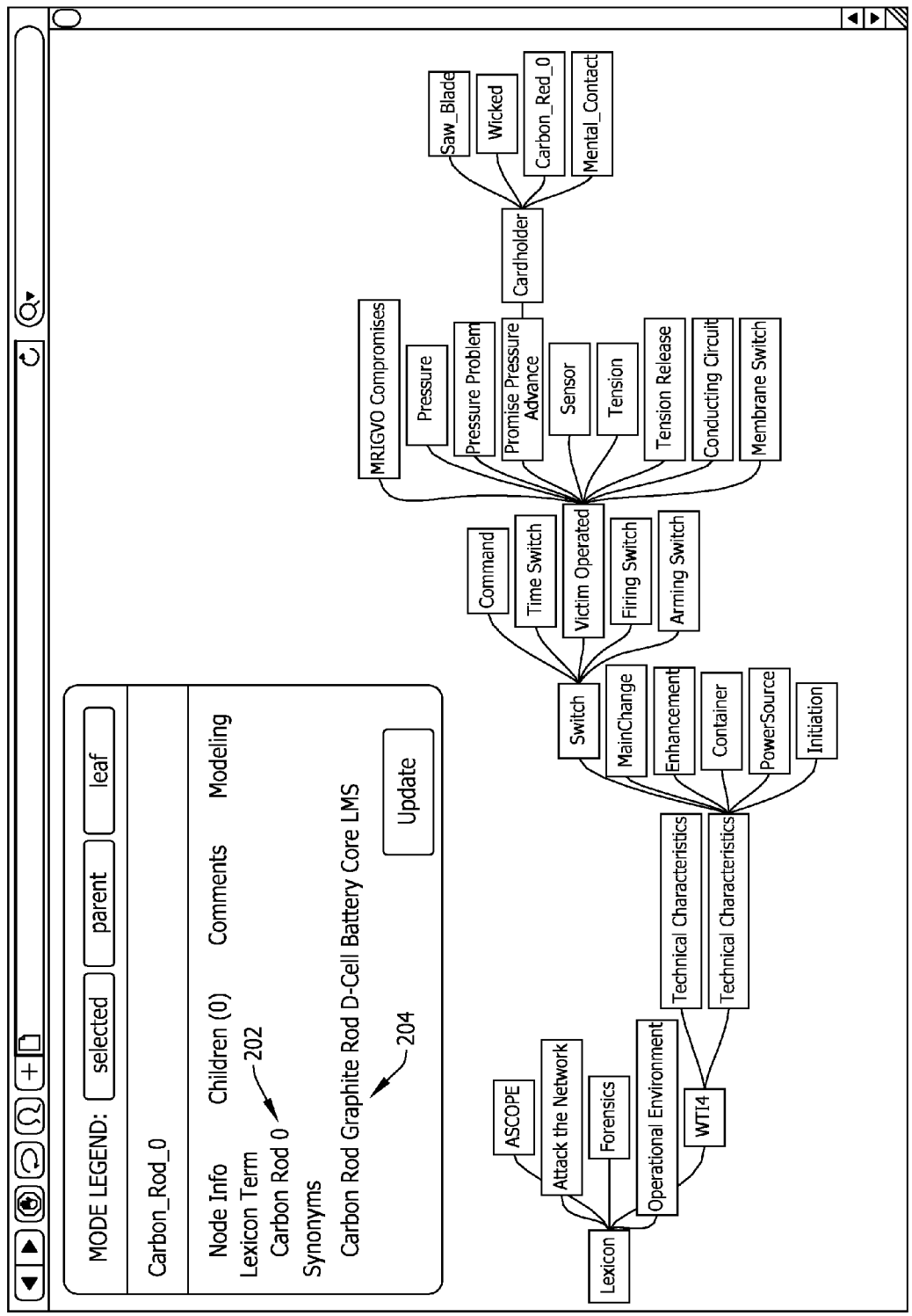
FIG. 2 illustrates a display screen of a system showing a user interface for a lexicon for an illustrative, but nonlimiting embodiment, e.g., improvised explosive device (IED)

Once the system 100 imports the lexicon data, the system 100 further processes the lexicon data to add detail information to the lexicon data. In the illustrative, but nonlimiting, exemplary embodiment, the system 100 solicits synonyms for each lexicon term in the lexicon data from SMEs. Referring now to FIG. 2, a screenshot of the illustrative, but nonlimiting, exemplary embodiment of the system 100 is depicted in which a lexicon for an improvised explosive device (IED) is displayed. In FIG. 2, the system 100 solicits synonyms for the lexicon term "Carbon Rod" 202. The lexicon term "Carbon Rod" is tagged with solicited synonyms such as "Graphite Rod," "D-Cell Battery Core," and "LMS" 204.

Figure 3:
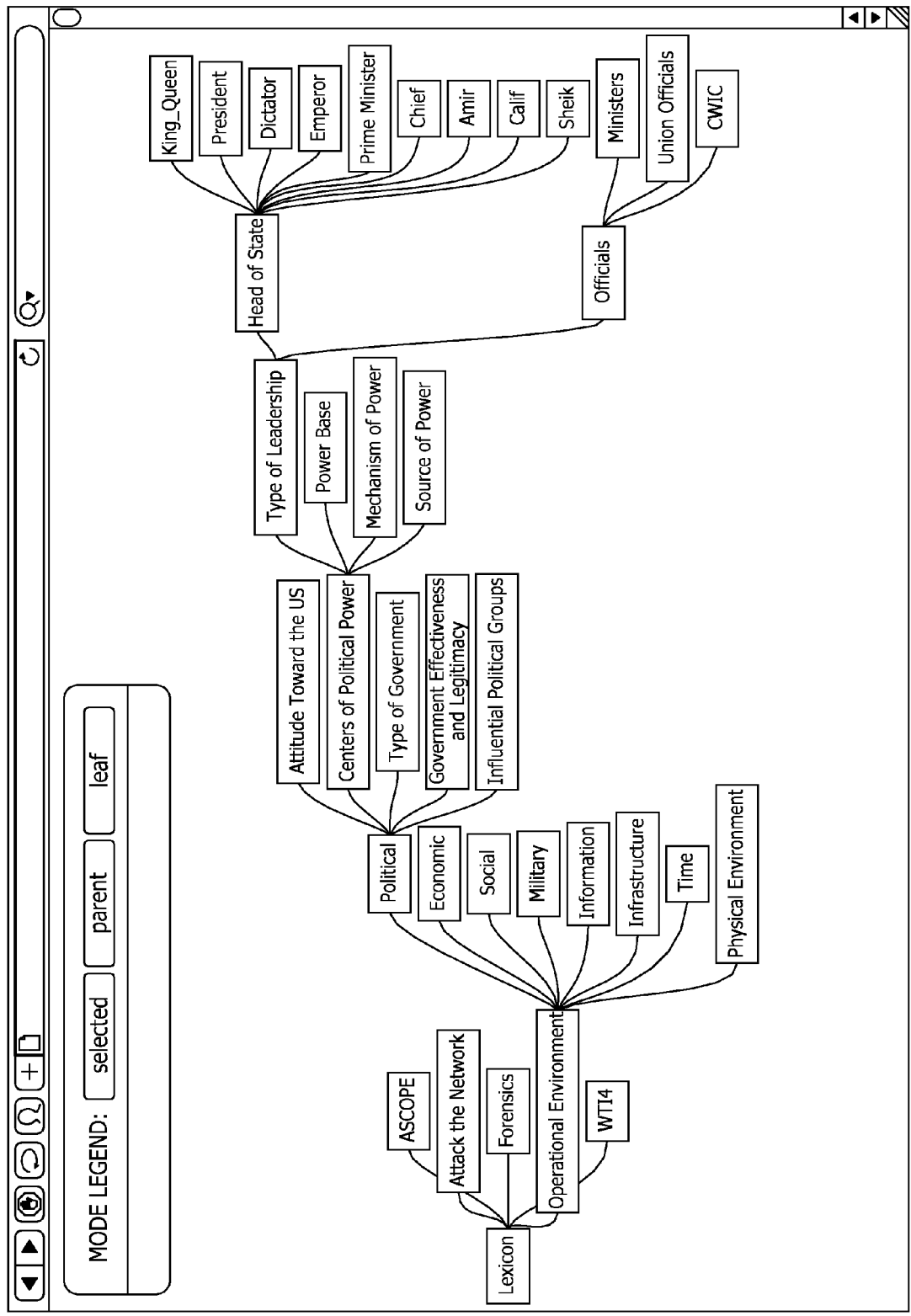
FIG. 3 illustrates a display screen of a system showing a user interface for a lexicon editor interface for a lexicon for an illustrative, but nonlimiting embodiment, e.g., improvised explosive device (IED)

Next, the system 100 builds a data structure of the lexicon data by creating a network of nodes where each node represents each lexicon term contained in the lexicon data. An example of this network structure is shown in FIG. 3 and generally indicated by numeral 302. In a comparable manner as FIG. 2, FIG. 3 depicts a screenshot of the system 100 in which a lexicon for an illustrative, but nonlimiting example, e.g., IED, is displayed. As shown in FIG. 3, each node in the network indicates a lexicon term obtained from the lexicon data, which is subordinate to any referenced parent node and is superordinate to any referenced child node. The hierarchical relationship among the nodes is encoded and represented in data stored in the data storage unit 130 of the system 100. The solicited synonyms for each lexicon term can also be associated with the node that corresponds to a lexicon term for which such synonyms are solicited.

In one illustrative, but nonlimiting, embodiment, the system 100 provides an interface for a user to edit the lexicon. As shown in FIG. 3, the system provides a lexicon editor that allows user modification and creation of lexicons. For example, users can add a new node to the existing network, delete a preexisting node from the network, or change a preexisting node of the network. The modified or revised version of the lexicon can be saved by a user into the data storage unit 130. Accordingly, the updated topology of the network will be stored in the data storage unit 130. Furthermore, the lexicon editor allows a user to change, modify, add, or delete synonyms and mapping rules that are associated with the nodes in the network.

(2) Source Data

In the illustrative, but nonlimiting, exemplary embodiment, the system 100 collects various types of source data that can be mapped with a lexicon from outside sources. The processor, e.g., server, 120 can receive source data from the external system 160. For example, the source data can be pushed to the processor, e.g., server, 120 by the external system 160 or pulled from the external system 160 by the processor, e.g., server, 120 through a network 170, as shown in FIG. 1. In the latter case, the processor, e.g., server, 120 sends a set of queries to the external system 160 for purposes of pulling data from the external system 160 or registers certain web-services with the external system 160 such that the data generated on the external system 160 can be periodically pushed over to the system 100. Like the network 140, the network 170 can be any data communications network capable of communicating data between the processor, e.g., server, 120 and the external system 160. The source data can represent any item of interest that can be matched against lexicons. In the illustrative, but nonlimiting, exemplary embodiment, the source data represents a set of reports describing activities that may involve IEDs. Alternatively, the system 100 can use any data stored in the data storage unit 130 as the source data.

Each supplier of source data is responsible for providing unique identification information for the source data. Each item in the source data can be associated with a unique identifier, e.g., a file path to the source data. In the alternative, a user, or the processor, e.g., server, 120 can provide a unique identifier to each item. Each supplier of source data can also provide information regarding a data type. The information regarding a data type is utilized to select the proper parser configuration and mapping rules for processing the source data and also for mapping lexicons to the source data, which is discussed below in reference to FIG. 4 through FIG. 7.

In the illustrative, but nonlimiting, exemplary embodiment, the source data can take a form of structured data and unstructured data. Any data such as XML (Extensible Markup Language), CSV (Comma-Separated Values), JSON (Java Script Notation), and RDF (Resource Description Framework) data can be used as structured data. As discussed in further detail below, the system 100 is designed to be capable of importing and processing both unstructured and structured data.

(3) Processing Source Data

The system 100 handles both unstructured and structured data received from the suppliers of source data. For unstructured data, the processor, e.g., server, 120 extracts textual data, e.g., text or key word, from each item in the source data. For each item, the parser 122 of the processor, e.g., server, 120 extracts at least one textual data along with any available structured supporting information such as metadata. The structured supporting information represents certain characteristics of an item. The parser 122 can be a software program residing on the processor, e.g., server, 120 or any combination of software and hardware that reside on the processor, e.g., server, 120 configured for the purposes described herein. Examples of the structured supporting information include information concerning a data type, a location, a date/time, and any description or summary contained in an item. In the illustrative, but nonlimiting, exemplary embodiment in which an item is a report about an IED, the structured supporting information can include the location information of where an IED was found, date/time when an IED was found or reported, data type information, and any description or summary about an IED itself. Any structured supporting information can be associated with the corresponding item or the source data as part of an analysis effort. It should be understood that the above example of IEDs was given only as merely an illustrative, but nonlimiting, example and other types of reports or documents can be used as an item for the illustrative, but nonlimiting, exemplary embodiment of the present invention.

Once the textual data is isolated, the processor, e.g., server, 120 is configured to find a match between the text represented by the textual data and lexicons. This process maps the text represented by the textual data extracted from the items to the lexicon terms. In addition, the processor, e.g., server, 120 can be configured to find a match between the text represented by the textual data and synonyms solicited for lexicon terms. The scan for synonyms uses a combined word list from the textual data and the lexicon to avoid redundant scans of the input.

Once a set of lexicon term matches are identified, the processor, e.g., server, 120 aggregates and stores certain information such as match counts, e.g., a number of matching lexicon terms identified for a certain group of the items, stores an identifier associated with each match, the offset for the match, and the structured supporting information associated with each item or source data. The aggregated information or data is later used for the display of the lexicon histogram view and for the filtering of the data source sets as discussed in further detail below with reference to FIG. 8.

The handling of structured data is more comprehensive and requires more involvement of the parser 122 than unstructured data as the mapping of structured data requires the flexibility to extract parts of the incoming source data and associate values in those fields to lexicon terms in a flexible manner. The first part of handling structured data is parsing. The parser 122 extracts data for each item. Unlike the unstructured data parsing, the parser 122 can be configured to extract any type of data (not just textual data) from each item. The result of this stage is a set of associated data ideally in the form of tuples, preferably, but not necessarily, having at least one of a source, predicate, and object obtained for each piece of data from each item in the source data as further discussed below with regard to FIG. 4 through FIG. 7. This tuple-structure allows flexible mapping of fields, parts of fields, or specific values in fields to lexicon terms. Once a tuple-structure is formed for each item, the processor, e.g., server, 120, or the rules engine 124, processes a mapping between the tuple-structure and the lexicon. The rules engine 124 can be a software program that resides on the processor, e.g., server, 120 or any combination of software and hardware that can be running on the processor, e.g., server, 120 that is configured for purposes described herein. The rules engine 124 can also be configured to reside on the external computer system 160. Preferably, a set of predefined rules are used by the processor, e.g., server, 120 or the rules engine 124 to map each item based on the information parsed from the source data. In the illustrative, but nonlimiting, exemplary embodiment, the processor, e.g., server, 120 or the rules engine 124 is configured to use at least one of the information contained in the subject, predicate, and object; however, it should be understood that the tuple-structure can be replaced with a non-tuple structure form having less than or more than three data elements and that any type of information can be represented by that structure for the purposes described herein.

A result of the parsing can take a form of Resource Descriptive Framework (RDF) data. RDF data can be generated for a group of the items. However, it should be understood that other forms of data can also be used that is compatible and suitable with the purposes described herein. Configuration parameters for the parser and rules engine are associated with each type of item, which is further discussed below with reference to FIGS. 4 through 7. Ideally such configuration information would also be represented as RDF tuples. However, it should be understood that other forms of data can also be used.

(4) Presenting Lexicon Analysis Result

Once each item from the source data has been parsed and mapped to a lexicon term(s), the system 100 presents a graphical user interface to the user for the presentation of the analysis result as shown in FIG. 1. There are numerous ways to implement a graphical user interface. First, the user can utilize the user computer 110 to access a web-page hosted by the processor, e.g., server, 120 through the network 140. In this first embodiment, the processor, e.g., server, 120 provides a web-page the user can access by using a conventional web browser or viewer, e.g., Safari, Internet Explorer, and so forth, that can be installed on the user computer 110. The lexicon analysis result can be presented to the user through this web-page. Second, the system 100 provides a computer application that can be downloaded to the user computer 110. In this second embodiment, the user can access a web-page hosted by the processor, e.g., server, 120 to download the computer application provided by the system 100. The computer application can be installed in the user computer 110, which provides the interface for the user to view the analysis result. In the third embodiment, the user computer 110 is a mobile device, e.g., an iPhone, which can access the processor, e.g., server, 120 through the network 140. In this embodiment, the network 140 can be a cellular network or a wireless internet. The system 100 provides a mobile application that can reside on the user's mobile device and which can provide an interface for the user to view the analysis result presented by the processor, e.g., server, 120. In yet a fourth embodiment, there can be the input/output device, e.g., keyboard, 112 that is in direct electronic communication with the processor, e.g., server, 120 with a separate electronic display 111. It should be understood that the above descriptions of the preferred embodiments of the system 100 are given only as an example, and should not be used to limit the scope of the present invention.

Figure 8:
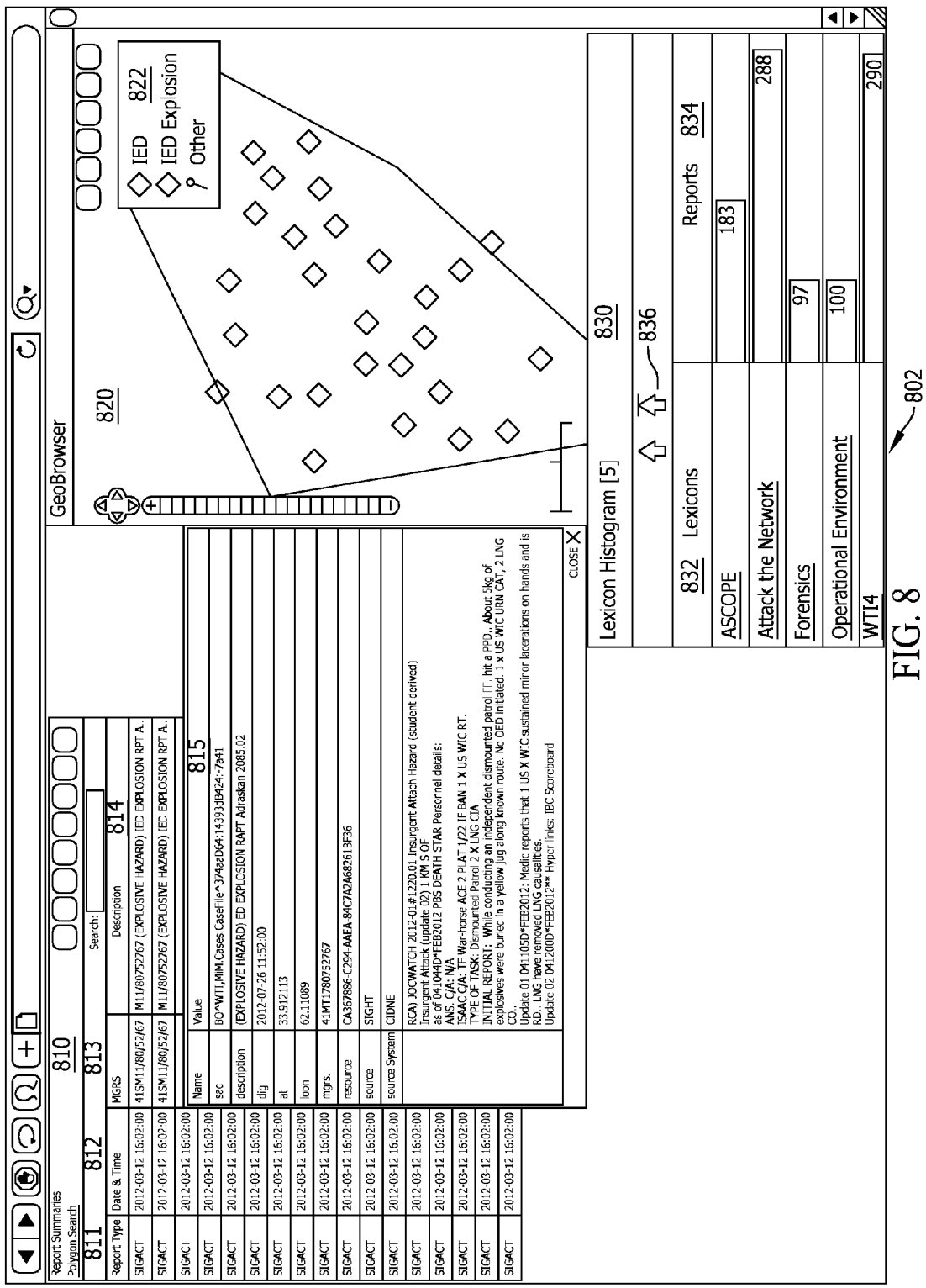
FIG. 8 illustrates a display screen of a system showing a user interface for the presentation of lexicon analysis result according to an illustrative, but nonlimiting, exemplary embodiment.

Regardless of which embodiment the system 100 employs, the user will be provided with an appropriate interface which enables the user to see the analysis result as shown in FIG. 8, which is generally indicated by numeral 802. The analysis result is preferably displayed simultaneously in a tabular view, geospatial view, and lexicon histogram, which is discussed further below in reference to FIG. 8.

2. Processing Structured Data

Because processing structured data is not same as that of unstructured data and requires more involvement of the parser 122 as shown in FIG. 1, further descriptions regarding the processing of structured data will be discussed herein with an illustrative, but nonlimiting, exemplary embodiment in which an item is a report about an IED. However, it should be understood that the given example is only intended to be an example and should not be considered as the only embodiment of the present invention.

(1) Parsing

Figure 4:
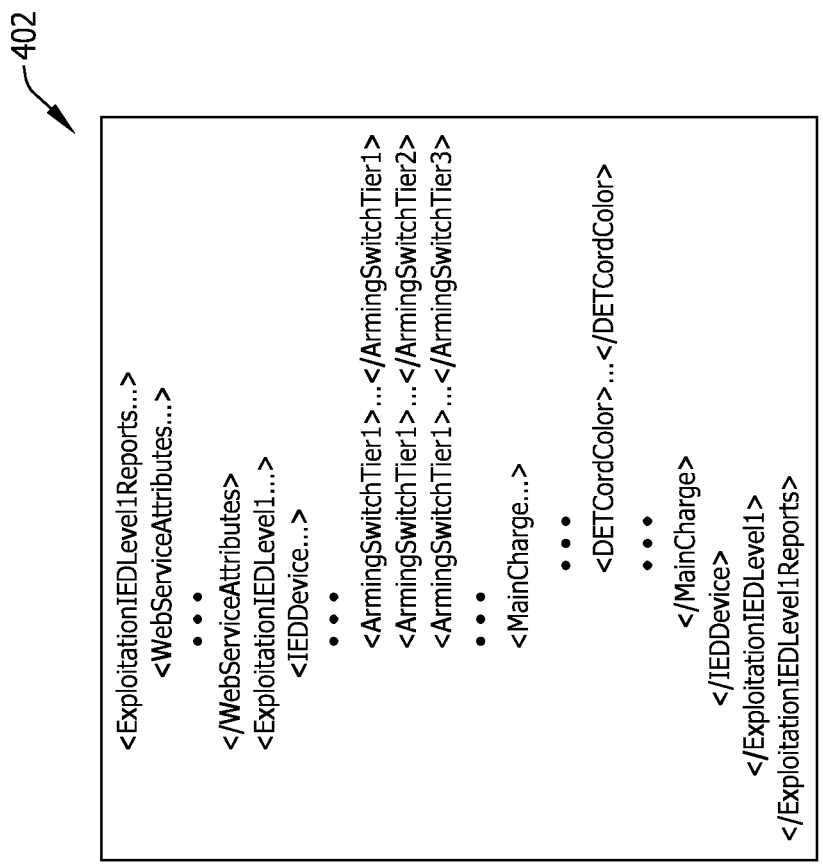
FIG. 4 illustrates an exemplary source data in a form of XML data according to an illustrative, but nonlimiting, exemplary embodiment.

As discussed above in Section 1, the first step of processing structured data is parsing. A primary purpose of parsing is to extract meaning from the source data. The parsing process can be adapted to any structured source data scheme but XML data will be utilized herein to provide an example of how the parsing occurs. FIG. 4 depicts exemplary source data in a form of XML data that is generally indicated by numeral 402. The data set shown in FIG. 4 is an input to the parser 122 of the processor, e.g., server, 120, shown in FIG. 1.

FIG. 5 depicts an actual parsing logic in a pseudo code form that is generally indicated by numeral 502. Preferably, this pseudo code (or the like) can be encoded into the parser 122 of the processor, e.g., server, 120, shown in FIG. 1. As shown in FIG. 5, the pseudo code is designed to parse each input element. The element can be any type of data that can be extracted from an item. The term "resource" in the pseudo code is used to refer to any object/element in the source data that has property data. For example, if "ArmingSwitchTier1" in FIG. 4 has any property data, the element "ArmingSwitchTier1" will be considered as a new resource according to the pseudo code, and the term "ArmingSwitchTier1" will be put into a tuple and will also be associated with such property data.

Figure 6:
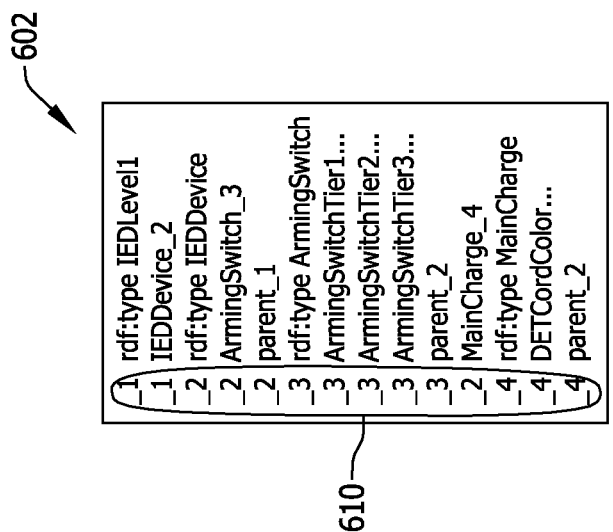
FIG. 6 illustrates an exemplary result of parsing in the form of RDF data according to an illustrative, but nonlimiting, exemplary embodiment.

FIG. 6 depicts an exemplary result of parsing in a form of RDF data, e.g., tuple, and is generally indicated by numeral 602. As shown in FIG. 6, the source XML data set has been parsed to generate tuple structures. Each tuple starts with a unique identifier that is indicated by numeral 610. It should be understood that the unique identifiers 610 of FIG. 6 are given as only examples and thus can be in a different form in the actual system. As can be seen in FIG. 6, resources are related from enclosing element, e.g., "<ExploitationIEDLevel1 . . . >", to enclosed element, e.g., "<IEDDevice . . . >", using the element name of the enclosed element, e.g., "IEDDevice", and fixed to a 'parent' property from enclosed to enclosing resources. For example, as shown in FIG. 6, the resource for "IEDDevice" includes a tuple structure, which indicates that the parent is the resource "IED Level 1." The tuple "_2 parent _1" shows that the resource "IED Level 1" is the parent of the resource "IED Device." The actual property names used in RDF can be URI values with namespaces.

The property names can be directly borrowed from the input element names. A method for generating property names can be controlled by manipulating a pseudo code for the parsing logic. For example, in FIG. 5, the pseudo code is expressly written to exclude any resource that represents the top-level resource, e.g., "Remove the top resource from the stack." More fundamentally, the generation of property names can also be configured at the parameter level of parsing. The user can set up the parser 122 to exclude certain elements from the source XML. The parsing process can be set up by a user through configuration parameters. For example, the user can set up certain parameters that define which elements are to be ignored, which elements are to be used as new resources, and which elements are to be grouped into new resources. These parameters can be encoded into the parser 122. As such, in the above example, the element "ExploitationIEDLevel1Reports" was excluded in FIG. 6 because the parser 122 was configured to ignore such element.

The tuple-structure preferably comprises at least one of a subject, predicate, and object with the most preferred tuple-structure utilizing all three elements. The subject preferably includes a general concept or conceptual information representing an item. The predicate preferably includes information representing one or more categories or subcategories of an item. The object preferably includes information representing the extracted data itself, e.g., resource.

(2) Mapping

Once the parsing is completed, and RDF data is generated as a result of the parsing, the RDF data is augmented with mapping data taken from the mapping rules. The mapping rules are predefined rules that map the resources, e.g., an element of an item, to lexicons. In particular, these mapping rules generate new RDF tuples that connect the resources to predefined resources that represent each lexicon term in the data storage unit 130 as shown again in FIG. 1. In one embodiment, the parser 122 uses the predicate and object of the tuple to generate new RDF tuples for mapping. However, any one of the subject, predicate, and object, or any combination thereof can be used to generate new RDF for mapping purposes. In the illustrative, but nonlimiting, exemplary embodiment, these rules are processed using the JENA generalized rule engine which takes tuple patterns to match, and tuple patterns to be generated on a match. In the preferred embodiment, the rules engine 124 of FIG. 1 can be configured as the JENA generalized rule engine.

FIGS. 7(a) and 7(b) depict exemplary mapping rules that augment the RDF data with mapping data. The rule shown in FIG. 7(a) that is generally indicated by numeral 702 indicates that a "MainCharge" with "MainChargeTier2" value "Commercial" and "MainChargeTier1" value "High Explosive" should produce new tuples for the resource (?mc) that maps to the lexicon term "HE_CommercialExplosives" and should match the terms "Commercial" and "High Explosives" in term highlighting. Highlighting is defined as any type of visual emphasis, e.g., background or text color change, colored border, and so forth. In addition to use in lexicon and term highlighting, the mapping rules can indicate that values are available under predefined property names to allow unification of different input terminology as shown in FIG. 7(b) that is generally indicated by numeral 740. The rule in FIG. 7(b) takes the key (?k) indicated by the "MainLocationKey" element in the input, and matches it to the "LocationKey" element of the resource (?l). After that, the rule extracts the "Latitude" property from that resource and assigns it to the "incident_lat" property of the original resource (?r).

(3) Aggregation

Once the RDF for each input item, e.g., report, is produced, the resources in the RDF are grouped into several categories of grouping and then aggregated into RDF for those groups. This process uses explicit links in the input, and fuzzy matching of values in the RDF data. In the preferred embodiment, location (latitude/longitude), and date/time group (DTG) are the values used for fuzzy matching, but the system 100 is designed to allow matching based on any shared value in the RDF resources including lexicon terms or values generated from the mapping rules. Because each report is represented by a top-level resource, and all resources are uniquely identified in RDF, the aggregation is a simple append operation merging the RDF statements from all reports in the group. This facilitates processing in a cloud or HADOOP type environment as all processing of reports or groups is working on local data and does not require access to other objects for processing. The aggregation of group RDF can be dynamic (on the fly), or static (performed at the time the report is initially received). In the preferred embodiment, the latter was selected, while in a cloud environment this aggregation may be performed dynamically by merging RDF in a reduce phase that then collects the values and combines them to form the desired output. This allows each system in the cloud cluster to operate on local data while then combining their collective output with minimal network traffic.

3. Presentation of Lexicon Analysis Result

As discussed above in Section 1(4), the illustrative, but nonlimiting, exemplary embodiment of the system 100 provides a graphical user interface to a user for purposes of presenting the lexicon analysis. FIG. 8 depicts a graphical user interface provided by the illustrative, but nonlimiting, exemplary embodiment of the system 100. As shown in FIG. 8, the system 100 provides three different displays: a tabular view 810, a geospatial view 820, and a lexicon histogram view 830 as generally indicated by numeral 802.

The tabular view 810 displays certain information of the items of the source data. The user can input initial criteria for selecting a certain group of the items. The user can also select the whole source data in which case the tabular view 810 displays all the items contained in the source data. In the illustrative, but nonlimiting, exemplary embodiment of the system 100, the tabular view 810 can be configured to display such information as a data type, date/time, location, and any description or summary contained in the items. In the illustrative, but nonlimiting, exemplary embodiment in which an item is a report about an IED, the tabular view 810 is configured to display "Report Type" section 811, "Date & Time" section 812, "MGRS" section 813, and "Description" section 814. The "Report Type" section 811 shows the types of reports. The "Date & Time" section 812 shows the date/time an IED was found or reported. The MGRS section 813 shows a geo-coordinate or a grid reference for an IED. The "Description" section shows any description or summary stated in an IED report. The user can click on one of the reports shown in the tabular view 810 to select one. If the user double clicks one report, a "Report Summary" window 815 pops up. The "Report Summary" 815 shows more detail information of the selected report.

The geospatial view 820 shows a geographical map displaying a geographical representation associated with location information extracted from each item of the source data. In the illustrative, but nonlimiting, exemplary embodiment in which an item is a report about an IED, the map in the geospatial view 820 can be configured to display the locations where IEDs were found or reported. In addition, the geospatial view 820 can be configured such that certain items with similar characteristics can be grouped together by the same color in the map. For example, as shown in FIG. 8, the "Legend" 822 indicates that all red colored reports in the map represent 'A' type IEDs and all green colored reports in the map represent 'B' type IEDs. Furthermore, the geospatial view 820 can be configured to color the reports based on their type, location, date/time, and any descriptive information contained in the reports. The reports with the same type, same location, same date/time, or same or similar description can be shown in the map with the same color. The geospatial view 820 and the tabular view 810 are configured to be displayed concurrently.

The lexicon histogram view 830 contains preferably two sections. A "Lexicon" section 832 lists lexicon terms that are mapped with the items shown in the tabular view 810. Alternatively, the user can select a certain lexicon term(s). A "Reports" section 834 shows a histogram which represents a match count for each of the lexicon terms listed in the "Lexicon" section 832. The match count refers to a total number of matches found in the items shown in the tabular view 810 for each lexicon term appearing in the "Lexicon" section 832. In addition, the match count can be configured to represent a total number of matches found in the items for a particular lexicon term appearing in the "Lexicon" section 832 plus a total number of matches with all of the lexicon terms that are subordinate to that particular lexicon term shown in the "Lexicon" section 832. For example, the lexicon histogram view 830 of FIG. 8 shows that there are 97 matches found in this set of the items shown in the tabular view 810 for the lexicon term "Forensics." The number 97 includes the number of matches for the term "Forensic" and the number of matches for all of the terms that are subordinate to the "Forensic." Furthermore, the user can click on each of the lexicon terms appearing in the "Lexicon" section 832. If the user clicks on one of the lexicon terms in the "Lexicon" section 832, all the reports in the tabular view 810 (or alternatively, the source data or any group of items chosen by the user) that were found by the parser 122 to be matching with the selected lexicon term will appear in the tabular view 810. This change will occur automatically by the system 100. In addition, the geospatial view 820 will also be updated with a new map indicating the locations of only those reports found to be matching the lexicon term selected by the user. In this way, the user is provided with an interactive display that automatically adapt to the user's filtering criteria.

The lexicon histogram view 830 also provides a navigation function to the user, which enables the user to search through the network of lexicon nodes. For example, the lexicon histogram view 830 can be configured such that if the user clicks on one of the buttons displayed in a "Menu" 836" section, the lexicon histogram view 830 will update its display with a list of only those lexicon terms that are defined to be a superordinate node of the lexicon term(s) selected by the user. Accordingly, a new set of histograms will show up in the "Reports" section 834 reflecting the changes made to the "Lexicons" 832. Moreover, the tabular view 810 and the geospatial view 820 can also be configured to reflect the change made by the user. For example, the tabular view 810 can be configured to display only those reports that were found to be matching the lexicon term(s) selected by user. The geospatial view 820 can also be configured to display the geographical representations of only those lexicon terms that are selected by the user.

The lexicon histogram view 830 can also be configured such that if the user clicks on one of the buttons displayed in the "Menu" 836 section, the lexicon histogram view 830 will update its display with only those lexicon terms that are defined to be a subordinate node of the lexicon term(s) selected by the user. Accordingly, a new set of histograms will show up in the "Reports" section 834 reflecting the changes made to the "Lexicons" 832. Moreover, the tabular view 810 and the geospatial view 820 can also be configured to reflect the change made by the user. In this way, the user can freely navigate through the lexicon network without having to do a manual search for a particular lexicon term in the network.

It should be also understood that FIG. 8 is intended to provide only an illustrative, but nonlimiting, example and should not be construed to limit the display to only those described in FIG. 8. One of ordinary skill in the art would understand that other types of information obtained from the source data can be displayed in FIG. 8 in addition to the information already described in FIG. 8.

Additionally, the illustrative, but nonlimiting, exemplary embodiment of the system 100 provides a filtering interface to the user. The preferred embodiment provides two types of filtering interfaces with respect to the tabular view 810 of FIG. 8. First is a source data filtering interface. As shown in FIG. 8, a "Source Data Filtering" interface 816 enables the user to filter the reports listed in the tabular view 810 by a report type, date/time, location, or description. For example, the user can click on the "Source Data Filtering" 816 in which case a new window with an appropriate number of data fields pops up in a user screen. The user can enter filtering criteria into the appropriate fields. For example, if the user wants to see the reports that were produced between Jan. 1, 2007 and Jan. 1, 2008, the user can put that filtering criteria into the appropriate fields of the window. The tabular view 810 updates its display according to the user's filtering criteria by displaying only those reports that meet the user's filtering criteria. The geospatial view 820 and the lexicon histogram view 830 concurrently update the display to reflect the changes made in the tabular view 810 in consistent with the descriptions stated above.

Figure 9:
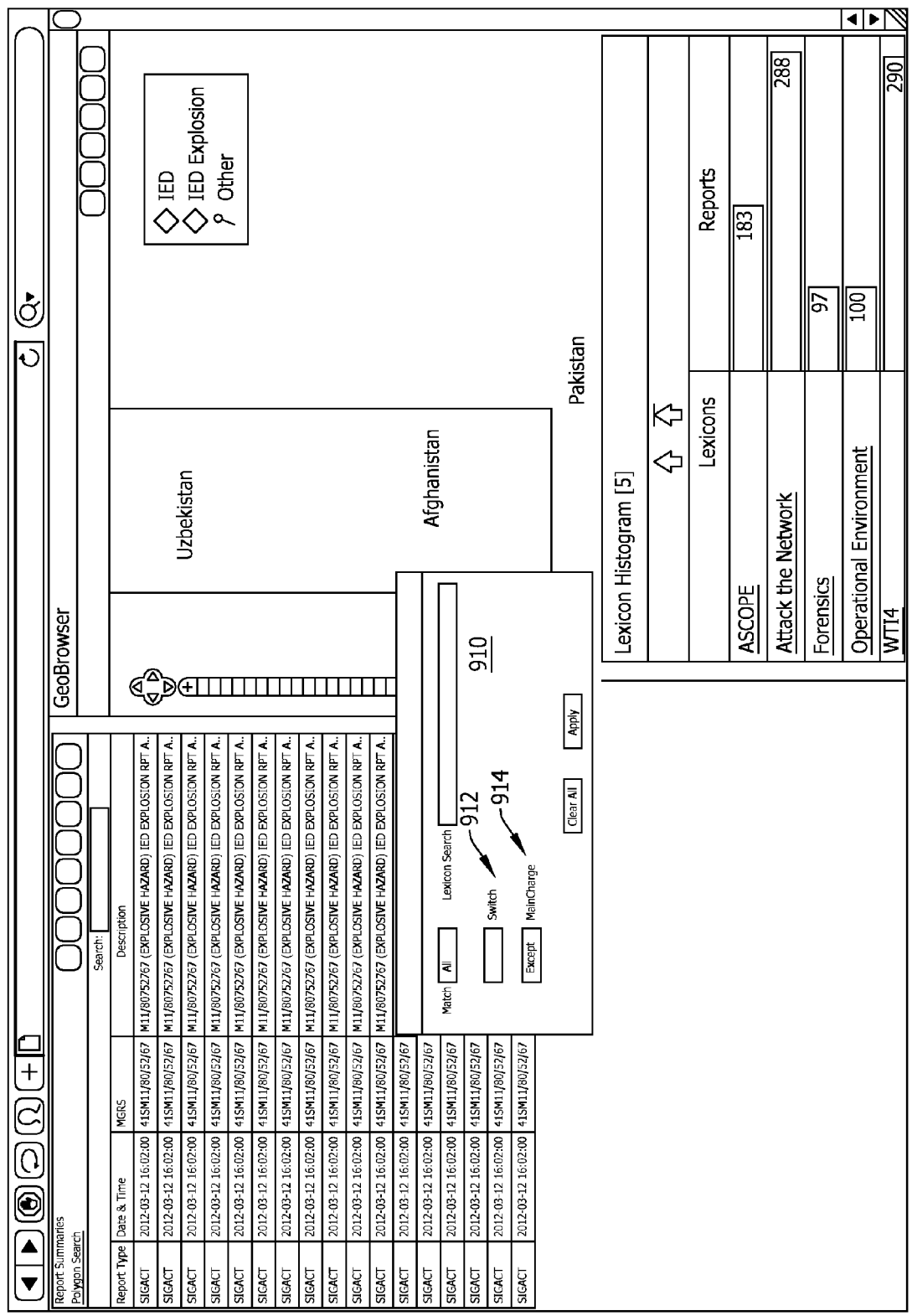
FIG. 9 illustrates a display screen of a system showing a user interface for a lexicon filtering interface according to an illustrative, but nonlimiting, exemplary embodiment.

The second filtering interface provided by the tabular view 810 is a lexicon filtering interface 817. The user is enabled to filter the reports listed in the tabular view 810 by lexicons. If the user clicks on the "Lexicon Filtering" 817, a "Lexicon Filter Builder" window 910 containing an appropriate number of data fields pops up, as shown in FIG. 9. The user can enter a lexicon term(s) into the appropriate field. For example, if the user wants to see only those reports that contain a lexicon term "Switch," then the user can enter the term "Switch" into the appropriate field, as shown in FIG. 9. The system 100 will update the tabular view 810 to reflect the user's input, i.e., displays only those reports mapped to the term "Switch." Likewise, the geospatial view 820 concurrently updates its display to reflect this change made by the user. Alternatively, the "Lexicon Filter Builder" window can be accessed from the lexicon histogram view 830. For example, the lexicon histogram view 830 can be configured such that if the user clicks on the "Reports" section 834 or any button in the "Menu" section 836, the "Lexicon Filter Builder" window pops up.

The lexicon filtering interface 817 further provides a Boolean search option. As shown in FIG. 9, the "Lexicon Filter Builder" 910 provides additional interface for the user to enter in a Boolean logic. For example, the user can use a pull-down menu bar, as shown in FIG. 9 to select one of the Boolean logics, e.g., AND, OR, Except, and so forth. As shown in FIG. 9, the user can filter the reports that contain the lexicon term "Switch" 912 while excluding the reports that contain the lexicon term "MainCharge" 914.

The illustrative, but nonlimiting, exemplary embodiment also provides color-based displays with respect to the geospatial view 820 of FIG. 8. For example, the user can change the settings of the "Legend" 822 from one setting to another. First, the "Legend" 822 can be configured to list a data type, date/time, and description. If the user selects a data type setting, the geospatial view 820 can be configured to color the reports by the type of each report, e.g., red for 'A' type IEDs and blue for 'B' type IEDs. Likewise, if the user selects a date/time setting, the geographical view 820 can be configured to color the reports by the date/time information contained in each report. The user is allowed to switch from one color group to another by interacting with the settings in the "Legend" 822.

Second, the user can change the settings of the "Legend" 822 to lexicons. In this example, the geospatial view 820 is configured to color the reports by lexicon terms that are mapped to the reports. For example, all of the reports mapped to the lexicon term "Forensics" can be displayed in red while all of the reports mapped to the lexicon term "Attack the Network" can be displayed in blue. The user is allowed to switch from one color group to another by interacting with the "Legend" 822.

It should be understood that the interfaces described above are given only as examples and should not be construed to limit the scope of the present invention. One of ordinary skill in the art can come up with different ways to implement the disclosed filtering interfaces that are consistent with the descriptions provided above.

Once the analysis data is complete and represented in the system 100, the user can select a working set of data, e.g., a case file, which matches some set of initial criteria chosen by the user. The initial criteria may not include lexicon-based criteria. For example, the user can select a case file by filtering the reports by certain location, data type, date/time, and description. Within that working set, the user can add or remove filters by interacting with three views 810, 820, and 830 consistent with the descriptions stated above. Furthermore, the user can select a case file that matches lexicon based criteria. For example, the user can select a case file by filtering the reports by a certain lexicon term(s). In this example, all of the reports mapped to that lexicon term can be shown through the tabular view 810, geospatial view 820, and/or lexicon histogram view 830, in consistent with the descriptions stated above in FIG. 8.

In an alternative embodiment, the system 100 can be configured to group the source data by certain incidents. For example, the system 100 can be configured to group the IED reports concerning an explosion incident occurred on a certain date. All the reports related to that particular incident can be grouped together and presented to the user with the views 810, 820, and 830. The tabular view 810 can be configured to display the reports related to that particular incident. The geospatial view 820 can be configured to display the geographical representations of the reports related to that particular incident. The lexicon histogram view 830 can be configured to display the lexicon terms and match counts for the lexicon terms that are mapped to the reports related to that particular incidents. Furthermore, the user can filter the collected reports by report type, date/time, description, location, and lexicons terms consistent with the descriptions stated above. In addition, in this alternative embodiment, the user can create a case file that includes many different types of incidents that meet search criteria. For example, the user can create a case file comprising an incident 'A', e.g., an explosion occurred on a certain date, and incident 'B', e.g., an explosion occurred in a certain area. The case file in this example would contain a group of the reports that meet the incident 'A' criteria and another group of reports that meet the incident 'B' criteria. Furthermore, the system 100 can be configured to filter the source data by incidents (not by reports). The user can filter the incidents in the selected case file by data type, date/time, description, location, and lexicon terms consistent with the descriptions stated above. For example, if the user filters the incidents by a location then all the incidents that meet the selected location criteria can be configured to be displayed through the views 810, 820, and 830. Additionally, the lexicon histogram view 830 can be configured to display the number of matching groups (i.e., number of incidents) for each lexicon term in the histogram, instead of the number of matching reports. The lexicon histogram view 830 can also be configured to display the number of matching sub-groups if the reports included in the selected incident can further be divided into sub-groups based on the information obtained from the tuple-structure analysis.

Figure 10:
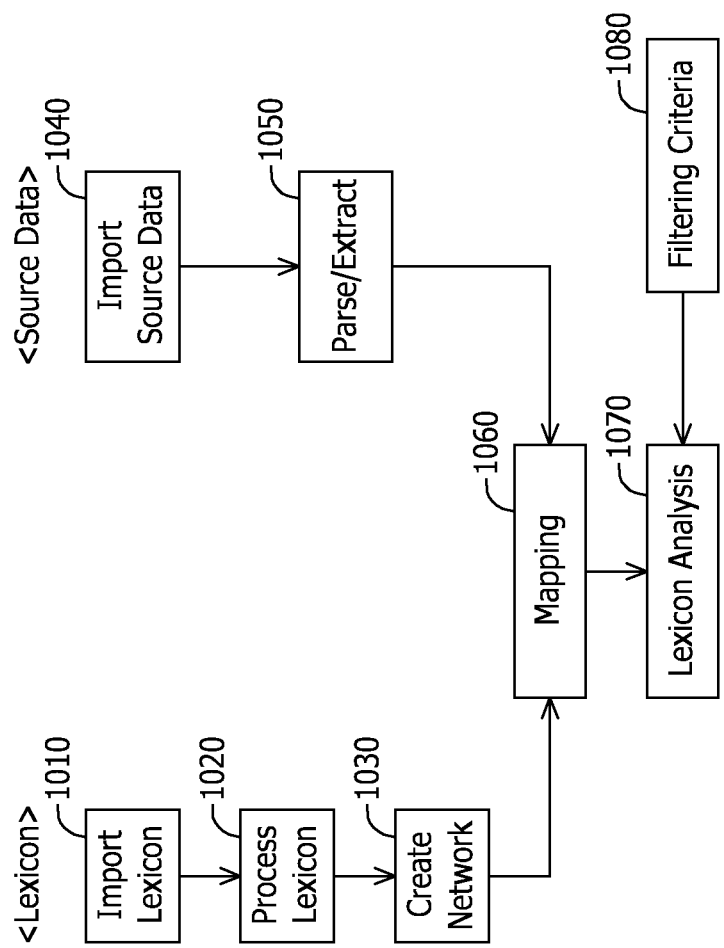
FIG. 10 illustrates a flowchart of a method for analyzing items using lexical analysis and filtering process according to an illustrative, but nonlimiting, exemplary embodiment.

FIG. 10 depicts a flowchart of a method of analyzing items using lexical analysis and filtering process. In the description of the flowcharts, the functional explanation marked with numerals in angle brackets, <nnn>, will refer to the flowchart blocks bearing that number.

At step <1010>, the system 100 imports lexicon data from an outside source. Alternatively, the system 100 can use any internal lexicon data stored in the data storage unit 130. The imported lexicon data is processed at step <1020> to add more value to the data. For example, the system 100 solicits synonyms for each lexicon term as described in Section 1. At step <1030>, the system 100 builds a data network comprising a plurality of nodes in which each node represents a lexicon term.

Once the lexicon hierarchy is created at step <1030>, the system 100 imports a source data at step <1040>. In the illustrative, but nonlimiting, exemplary embodiment, the system 100 receives the source data from the external system 160. The source data can be both unstructured and structured data. At step <1050>, the parser 122 of the system 100 parses the source data. In case of unstructured data, the parser 122 simply parses textual data, e.g., text or key word, from the source data. In case of structured data, the system 100 parses any type of data from the source data and creates a tuple structure, which is described above in Section 2.

At step <1060>, the system 100 maps the items with lexicons. For unstructured data, the system 100 maps the text represented by the textual data of the items with lexicons. In addition, the system 100 can be configured to map the text represented by the textual data with the synonyms for lexicons solicited at step <1020>. For structured data, the system 100 uses the rules engine 124 to map the tuples with lexicons, which is previously described above in Section 2.

At step <1070>, the system 100 is now ready for presenting the lexicon analysis to the user. The system 100 can be configured to present different types of display modes to the user as discussed above in Section 3. Furthermore, the user can, at step <1080>, filter the items or lexicons by setting up various filtering criteria as discussed in Section 3.

Furthermore, it should be understood that when introducing elements of the present invention in the claims or in the above description of the preferred embodiment of the invention, the terms "have," "having," "includes" and "including" and similar terms as used in the foregoing specification are used in the sense of "optional" or "may include" and not as "required." Similarly, the term "portion" should be construed as meaning some or all of the item or element that it qualifies.

Thus, there have been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims that follow.

The invention claimed is:

1. A method for analyzing items using lexical analysis and filtering process comprising of:
   storing a plurality of items in a data storage unit, wherein said plurality of items are represented by source data and said source data is one of structured data and unstructured data;
   parsing the unstructured data of the source data to extract at least One textual data along with any available structured supporting information;
   parsing the structured data of the source data to extract a set of associated data in a tuple structure, said tuple structure being formed by each a subject being the conceptual information representing each item of said plurality of items, a predicate including information representing one or more categories of each item of said plurality of items, and an object including information representing the extracted data itself;
   processing the extracted data from each item of said plurality of items, wherein said extracted data is associated with an item of said plurality of items;
   processing the extracted data from each item of said plurality of items, wherein said extracted data is matched against a list of synonyms associated with said plurality of items;
   displaying a first group of said items based on said extracted data of said items on an electronic display presented in at least one of a tabular view and a geospatial view, wherein said electronic display is electrically connected to at least one processor in electronic communication with said source data, wherein said first group of said items represents items having at least one common characteristic of said extracted data;
   mapping each of said plurality of items with at least one lexicon term, wherein said extracted data is analyzed to identify a match between said plurality of items and lexicon terms, wherein said lexicon terms are represented as a network of a plurality of nodes and each node of said plurality of nodes represents a lexicon term, which is subordinate to at least one of a parent node and a child node;
   mapping each of said plurality of items with at least one lexicon term based on an associated synonym, wherein said extracted data is analyzed to identify a match between said plurality of items and synonyms of said lexicon terms, wherein said lexicon terms are represented as said network of said plurality of nodes and each node of said plurality of nodes represents said lexicon term, said associated synonyms corresponding with at least one lexicon term identified at each node of said plurality of nodes; and
   displaying a second group of said items, wherein said second group of items represent said items mapped to a first matching lexicon term of said plurality of lexicon terms on said electronic display presented in at least one of said tabular view and said geospatial view, wherein said electronic display is electrically connected to at least one processor in electronic communication with said source data.

2. The method for analyzing items using lexical analysis and filtering process of claim 1, further comprising receiving said source data from an external processor system, wherein said processor receives said source data from said external processor system.

3. The method for analyzing items using lexical analysis and filtering process of claim 1, wherein said structured data is data comprising of at least one of XML (Extensible Markup Language) data, CSV (Comma-Separated Values) data, JSON (Java Script Notation) data, and RDF (Resource Description Framework) data.

4. The method for analyzing items using lexical analysis and filtering process claim 1, wherein said first matching lexicon term is replaced with a second matching lexicon term and said second matching lexicon term is subordinate to said first matching lexicon term.

5. The method for analyzing items using lexical analysis and filtering process of claim 1, wherein said first matching lexicon term is replaced with a third matching lexicon term and said third matching lexicon term is superordinate to said first matching lexicon term.

6. The method for analyzing items using lexical analysis and filtering process of claim 1, wherein said characteristic of said extracted data comprises information that represents one of a data type, a location, and a date/time.

7. The method for analyzing items using lexical analysis and filtering process of claim 1, further comprising utilizing a user interface electrically connected to said processor for modifying said network by one of adding, deleting, and changing, a lexicon term of said plurality of lexicon terms in said network.

8. The method for analyzing items using lexical analysis and filtering process of claim 1, further comprising utilizing a user interface electrically connected to said processor for filtering said plurality of items based on matching lexicons, wherein said processor presents a group of items of said plurality of items to said electronic display and said group of items of said plurality of items are mapped to a fourth matching lexicon term and said fourth matching lexicon term is selected from input from said user interface.

9. The method for analyzing items using lexical analysis and filtering process of claim 8, further comprising providing a Boolean search option through said user interface.

10. The method for analyzing items using lexical analysis and filtering process of claim 1, further comprising providing a report listing of an improvised explosive device (IED) as an item of said plurality of items.

11. The method for analyzing items using lexical analysis and filtering process of claim 1, further comprising concurrently presenting said tabular view and said geospatial view on said electronic display with said processor.

12. The method for analyzing items using lexical analysis and filtering process of claim 1, wherein said extracted data is further analyzed to identify a match between said plurality of items and synonyms for said lexicon terms.

13. A system for analyzing items using lexical analysis and filtering process comprising of:
a data storage unit storing source data comprising of a plurality of items, wherein said source data is one of structured data and unstructured data;
a processor associated with said data storage unit, wherein said processor extracts data from both the structured data and the unstructured data, the unstructured data being parsed to extract at least one textual data along with any available structured supporting information and the structured data being parsed to extract a set of associated data in a tuple structure, said tuple structure being formed by each a subject being the conceptual information representing each item of said plurality of items, a predicate including information representing one or more categories of each item of said plurality of items, and an object including information representing the extracted data itself; said extracted data being associated with an item from which said data is extracted and said extracted data matched against a list of synonyms associated with said item, the processor further mapping each of said plurality of items with at least one lexicon term and said extracted data is analyzed to identify a match between said plurality of items and lexicon terms and said lexicon terms are represented as a network of a plurality of nodes and each node represents a lexicon term, which includes at least one of a parent node to which said lexicon term is subordinate and a child node to which said lexicon term is superordinate, the processor further mapping each of said plurality of items with at least one lexicon term based on an associated synonym, wherein said extracted data is analyzed to identify a match between said plurality of items and synonyms of said lexicon terms, wherein said lexicon terms are represented as said network of said plurality of nodes and each node of said plurality of nodes represents said lexicon term, said associated synonyms corresponding with at least one lexicon term identified at each node of said plurality of nodes; and
an electronic display for presenting said source data utilizing said processor configured to present a first group of said items based on said extracted data of said items in at least one of tabular view and geospatial view and said first group of said items represent items having at least one common characteristic of said extracted data, and present a second group of said items and said second group of items represent said items mapped to a first matching lexicon terms of said plurality of lexicon terms in at least one of said tabular view and said geospatial view.

14. The system for analyzing items using lexical analysis and filtering process system of claim 13, wherein said processor further receives said source data from an external computer system.

15. The system for analyzing items using lexical analysis and filtering process system of claim 13, wherein said structured data is data comprised of XML (Extensible Markup Language) data, CSV (Comma-Separated Values) data, JSON (Java Script Notation) data, and RDF (Resource Description Framework) data.

16. The system for analyzing items using lexical analysis and filtering process system of claim 13, wherein said first matching lexicon term is replaced with a second matching lexicon term and said second matching lexicon term is subordinate to said first matching lexicon term.

17. The system for analyzing items using lexical analysis and filtering process system of claim 13, wherein said first matching lexicon term is replaced with a third matching lexicon term and said third matching lexicon term is superordinate to said first matching lexicon term.

18. The system for analyzing items using lexical analysis and filtering process system of claim 13, wherein said characteristic of said extracted data comprises information that represents one of a data type, a location, and a date/time.

19. The system for analyzing items using lexical analysis and filtering process system of claim 13, wherein said processor is electrically connected to a user interface that allows modification of said network and said user interface enables said user to add, delete, or change a lexicon node in said network.

20. The system for analyzing items using lexical analysis and filtering process system of claim 13, wherein said processor is electrically connected to a user interface that provides for filtering said items based on matching lexicons and said processor presents a group of said items and said group comprises a plurality of items mapped to a fourth matching lexicon term and said fourth matching lexicon term is selected through said user interface for viewing on said electronic display.

21. The system for analyzing items using lexical analysis and filtering process system of claim 13, wherein said user interface further provides a Boolean search input option for viewing on said electronic display.

22. The system for analyzing items using lexical analysis and filtering process system of claim 13, wherein said item is a report of an improvised explosive device (IED) for viewing on said electronic display.

23. The system for analyzing items using lexical analysis and filtering process system of claim 13, wherein said tabular view and geospatial view are concurrently presented by said processor for viewing on said electronic display.

24. The system for analyzing items using lexical analysis and filtering process of claim 13, wherein said extracted data is further analyzed to identify a match between said plurality of items and synonyms for said lexicon terms.

* * * * *